United States Patent [19]

Moisson

[11] 4,421,945
[45] Dec. 20, 1983

[54] JUNCTION ASSEMBLY

[75] Inventor: Marc F. Moisson, Strombeek-Bever, Belgium

[73] Assignee: N.V. Raychem S.A., Kessel, Belgium

[21] Appl. No.: 878,424

[22] Filed: Feb. 16, 1978

[30] Foreign Application Priority Data

Apr. 21, 1977 [GB] United Kingdom ............... 16699/77
Oct. 12, 1977 [GB] United Kingdom ............... 42545/77

[51] Int. Cl.³ .................... H02G 15/113; H02G 15/18
[52] U.S. Cl. ................................. 174/92; 174/DIG. 8
[58] Field of Search ................... 174/91, 92, 93, 88 R; 156/49, 86, 85

[56] References Cited

U.S. PATENT DOCUMENTS

| 2,639,312 | 0/0000 | Kerwin . | |
| 2,771,502 | 11/1950 | King et al. | 174/92 |
| 2,867,680 | 1/1959 | Stecher | 174/92 |
| 3,518,358 | 6/1970 | Brown | 174/138 |
| 3,663,740 | 5/1972 | Dellett | 174/92 |
| 3,916,086 | 10/1975 | Gillemot et al. | 174/92 X |
| 3,935,373 | 1/1976 | Smith et al. | 174/92 X |
| 3,936,590 | 2/1976 | Albano | 174/92 |
| 3,982,319 | 9/1976 | Bice | 174/92 X |
| 4,085,286 | 4/1978 | Horsma et al. | 174/92 |
| 4,095,044 | 6/1978 | Horsma et al. | 174/92 X |
| 4,103,911 | 8/1978 | Giebel et al. | 174/21 R X |
| 4,117,259 | 9/1978 | Giebel et al. | 174/92 |
| 4,135,587 | 1/1979 | Diaz | 174/92 |
| 4,142,592 | 3/1979 | Brusselmans | 174/DIG. 8 X |
| 4,347,402 | 8/1982 | Reyners | 174/91 |

FOREIGN PATENT DOCUMENTS

| 178995 | 12/1953 | Austria . | |
| 845666 | 12/1976 | Belgium . | |
| 1966933 | 2/1969 | Fed. Rep. of Germany ... | 174/DIG. 8 |
| 1908996 | 12/1970 | Fed. Rep. of Germany . | |
| 1941166 | 2/1971 | Fed. Rep. of Germany . | |
| 2429049 | 1/1976 | Fed. Rep. of Germany . | |
| 2542508 | 3/1977 | Fed. Rep. of Germany . | |
| 321223 | of 0000 | United Kingdom . | |
| 473307 | of 0000 | United Kingdom . | |
| 872706 | 7/1961 | United Kingdom . | |
| 884786 | 12/1961 | United Kingdom . | |
| 1248908 | 10/1971 | United Kingdom . | |
| 1317654 | 5/1973 | United Kingdom . | |
| 1431167 | of 0000 | United Kingdom . | |

Primary Examiner—Roy N. Envall, Jr.
Attorney, Agent, or Firm—Lyon & Lyon

[57] ABSTRACT

A re-enterable assembly for protecting and sealing a junction between conduits, comprising a split tube and support means for positioning at each end of the tube, one on each side of the junction. The support means has apertures to provide channels for the conduits, and in one embodiment, is extended about the conduits to within the cavity about the junction to provide a seal that improves with an increase in pressure within the cavity.

24 Claims, 23 Drawing Figures

JUNCTION ASSEMBLY

The present invention relates to junctions in conduits, methods of protecting them, and assemblies therefor.

It is frequently necessary to insulate and protect junctions in conduits, for example electrical cables. In effecting junctions between electrical cables, for example telephone or power cables, on site, many problems arise in meeting the necessary requirements of continuity of insulation and earthing, of rendering the joint waterproof and proof against chemical attack, of mechanical strength, resistance to pull-out of the cables under tension and resistance to compression, flexing and impact. The means for protecting the junction normally has to provide mechanical protection, give overall electrical insulation, prevent ingress of water and other contaminants and, when the cable is a pressurized cable, be pressure-tight.

There have been many different proposals for providing the protection required, but there still remains a considerable demand for methods and devices that are less dependent on the use of skilled labour, and which enable a splice to be covered quickly and reliably.

U.S. Pat. No. 2,639,312 (Kerwin) discloses a cover for insulating a junction, or splice, between cables. The splice made between each pair of the exposed conductors of the cables is electrically insulated from the others by means of a "splicer core" which is designed to hold the spliced areas apart. The splicer core comprises a cylinder in which is provided resilient chambers connected to the surface of the core by a slot, there being one chamber per individual splice. When each splice is located in its chamber, the assembly is wrapped up with tape.

This assembly has the disadvantage that the splicer core does not provide an environmental seal and, because it is resilient, does not provide mechanical resistance against pull-out of the cables. Furthermore, the assembly has to be totally dismantled when even one cable has to be repaired or removed or a new cable added, and does not allow connexions to be made between adjacent cables. The tape-wrapping is also time-consuming.

It has been proposed in British Specification No. 1,431,167 to provide a splice case assembly which is relatively simple to install and which can easily be opened to allow the splice therein to be repaired or modified. British Specification No. 1,431,167 discloses and claims an assembly for protecting and insulating a junction between conduits, which comprises a relatively rigid longitudinally split tube of internal diameter such that the tube will accommodate the junction, relatively rigid support means for the split tube, and a heat shrinkable sleeve of length greater than the length of the tube with the support means, at least part of the inner walls of the heat shrinkable sleeve having applied thereto sealing material such that, on shrinking the sleeve down over the junction, the end regions of the sleeve which shrink down over the conduits are sealed thereto.

An assembly constructed in this way allows the splice to be inspected by cutting off the sleeve in the area of the split tube and opening the split tube. When a new cable is to be added to, or one removed from, the assembly, the entire sleeve may be cut off and the support means removed. This has been found to be practicable and the splice case assembly has proved to be a commercial success. However, it has been found that when two or more cables are required to enter the splice area from one end it is necessary to provide additional sealing means at the point where the two or more cables meet the support means or the shrinkable sleeve. In the case of a pair of cables adhesive tape may be, for example, wrapped in the form of a figure of eight around and between the cables. However when, for example, one of the pair of cables has to be modified or repaired or another cable added, the mass of adhesive tape and the support means have to be removed, a messy and time-consuming job.

There thus remains a need for a splice case assembly which is relatively easy and quick to install, which may easily be opened to allow access to the splice and which does not require total dismantling when a new conduit is to be added or one removed, and which itself may include provision for sealingly encapsulating a splice or junction in which two or more cables are to enter from one side.

The present invention provides an assembly for protecting and insulating a junction between conduits, the assembly comprising a tubular sleeve comprising a longitudinally split tube of internal diameter such that it can accommodate the junction, support means for the split tube being provided for positioning on each side of the junction, and preferably being positioned one at each end of the tube, at least one support means being contoured to provide a plurality of channels, each channel being capable, if necessary in cooperation with the tubular sleeve, of forming an outlet capable of accommodating a conduit and capable of being sealed thereto, whereby each conduit can be sealed into its outlet and thus into the assembly independently of any other conduit present therein. Advantageously there is provided a protective sleeve which preferably is electrically insulating and may be a heat shrinkable sleeve, preferably a heat shrinkable wraparound sleeve, which, on shrinkage, will surround the assembly and a length of the conduits protruding therefrom.

The invention also provides a conduit junction, especially a cable junction, protected and insulated by the assembly.

The present invention further provides a support means for use in locating and sealing a conduit in a housing, the housing preferably being the split tube of the assembly of the invention, the support means being capable of cooperating with the housing and so contoured as to provide a plurality of channels, each channel being capable of cooperation with the tubular sleeve to form an outlet, each outlet being capable of accommodating a conduit and being provided with a sealant damming means to seal, or to aid in the sealing of, the conduit into the outlet.

The present invention also provides a kit of parts suitable to provide an assembly for protecting and insulating a junction between conduits comprising a tubular sleeve comprising a longitudinally split tube of internal diameter such that it can accommodate the junction and support means for each end thereof, at least one support means being contoured to provide a plurality of channels, each channel being capable of cooperation with the tubular sleeve to form an outlet capable of accommodating a conduit and capable of being sealed thereto and preferably a protective sleeve for surrounding the assembly and a length of the conduits protruding therefrom.

The present invention still further provides a method of protecting and insulating a junction between conduits which comprises positioning over the junction an assembly comprising a tubular sleeve comprising a longitudinally split tube provided at each end with a support means therefor, at least one support means contoured to provide a plurality of channels, each channel being capable of cooperation with the tubular sleeve to form an outlet, positioning a conduit in a channel, positioning about the assembly a tubular sleeve so as to form outlets and sealing the conduit into the outlet so that it is sealed into the assembly independently of any other conduit present.

The tubular sleeve comprises the longitudinally split tube and preferably also comprises the protective sleeve.

Preferably the channels in the support means cooperate with the tubular sleeve to provide outlets, closed in cross-section, for the conduits.

The present invention also provides an assembly as described above in which a, the, or each, support means contoured to provide one or more channels has an outer circumferential surface that preferably extends to provide contacting support for the split tube over substantially the whole of its circumference at at least one cross-section thereof, the shape of at least the outer circumferential portion of the support means being deformable providing access to the or each channel whereby a conduit may be inserted laterally into the channel, the support means comprising means for sealing a conduit positioned in the channel, the sealing means being such that an increase in pressure within the assembly will not increase, and preferably will decrease, the tendency of a bond between the sealing means and the conduit to fail by peeling.

One construction of the support means suitable for use in the invention is one in which the sealing means extends into the cavity defined by the support means and the tubular sleeve.

Advantageously, the sealing means has opposed surfaces of which, in use, one is within and forms a boundary of the said cavity and the other is in sealing engagement with the conduit. The sealing means may be integral with the support means and may be attached thereto. The sealing means, at least when it is integral with the support means, is also deformable to allow lateral access to its interior. Preferably the circumferential portion of the support means and the sealing means are provided with surfaces that, when spaced apart, together form an aperture, advantageously a continuous slit. Accordingly, an elongate article, e.g., a cable, may be inserted into each channel and its corresponding sealing means, through the slit.

The sealing means is advantageously integral with the support means and is advantageously in the form of a sleeve, and is an inward (i.e., into the cavity of the assembly) extension of the wall of the channel to which it corresponds.

The sealing means is advantageously in the form of a heat-shrinkable sleeve, preferably integral with the portion of the support means that forms the wall of the channel, but it may be a separate e.g. a wrap-around, heat shrinkable sleeve securely attached thereto, for example by shrinkage thereover. The interior surface of the channel wall, and especially of the sealing means, may be provided with sealant, adhesive, or other material that will assist the sealing of the sealing means about the conduit, the material being chosen according to the materials of the various components and service requirements. Preferably the portion of the support means that forms the channel wall is not itself heat shrinkable for reasons which will be apparent from the subsequent description.

In order to assist in sealing, the surfaces of the support means and the sealing means that, when spaced apart, from the aperture that allows lateral access of a conduit may be provided with means to assist bonding after installation of a conduit. This may comprise either adhesive, sealant, or other material on the cooperating surfaces, and/or external mechanical means whereby the two surfaces are urged together. Especially where the sealing means is a heat-shrinkable sleeve portion, the mechanical means must be capable of withstanding considerable forces. Suitable means are, for example, those disclosed in British Patent Specifications Nos. 1,155,470, 1,219,768, 1,266,719, British Patent Applications Nos. 39515/75 (DAS No. 25 43 358), and 39516/75 (DOS No. 25 43 338) and South African Patent Application No. 76/3839, the disclosures of all of which are incorporated by reference herein. The mechanical means is advantageously electrically conductive and may form part of a continuous earth connection between the shields of electrical cables.

The support means is preferably provided, radially within the circumferential surface material, with one or more supporting devices, which extend about the outer wall of the portion of the material whose inner wall defines the channel, or channels. The shape and number inter alia will depend on the number of channels and their size in relation to the circumference of the support member. The supporting device or devices advantageously extend, in total, about the whole circumference of the support member, and preferably provide support to the portions of the walls of the support member that define the aperture or apertures.

The supporting device is advantageously constructed to extend into the interior of the assembly, to overlie the portions of the walls of the sealing means that define the aperture or slit.

A portion or portions of the supporting device near the circumference may also extend into the interior, to provide additional support for the split tube or other parts that form the circumferential wall of the assembly.

The support device is advantageously provided with resilient or other means capable of urging the aperture walls together thereby assisting in sealing after installation. The urging means may be provided with heat-releasable locking means, or it may itself be heat-activatable. In this way, the installation procedure is eased since in installing the support member over the conduit or conduits the walls of the or each aperture have to be parted. The urging means may, for example, comprise a heat-shrinkable metal or heat-shrinkable polymeric especially elastomeric strip or coil spring, the ends of which are diametrically opposed at the circumference of the support means. Alternatively it may comprise an extended tension spring, having a heat-meltable or softenable member preventing recovery, the principle of operating being as disclosed in U.S. Pat. No. 3,243,211. In each case, application of heat to the urging means activates it in some way, applying more pressure to the walls of the or each aperture to assist closure and sealing, both of the support means and of the sealing means.

The material, dimensions and method of manufacture of the support means will, of course, be chosen according to the conditions to which it will be subjected in use.

Advantageously, for use in an assembly for protecting an electrical cable splice, e.g. a splice in a telephone or other telecommunication cable, the support means may be moulded from a crosslinked polymer, for example, polyethylene or an elastomeric material as described in British Pat. No. 1,010,064 so that a heat-shrinkable sealing means may be formed integrally therewith. The support member may be moulded in a configuration other than that which in use is adopted. For example, the support means may be moulded in a configuration in which the apertures (slits) are absent, and in which the portion of the surface that becomes the outer circumferential surface is an interior surface, at the end region remote from that comprising the sealing means, the portion that forms the channel walls being intermediate between the ends. After moulding, the sealing means is or are expanded, to an internal cross-section greater than that of the exterior of the conduits with which the support means is to be used, having been moulded with an internal cross-section smaller than the exterior of such cables in order that, on heating, the sealing means will recover to fit tightly about the conduit. The expanded internal walls of the sealing means are coated with sealant, or other material as required. In the end region which becomes the outer circumferential portion there may be provided a circumferential region, spaced from the end itself, or reduced wall thickness.

The end region is doubled back on itself, so as to overlie the intermediate region carrying the channels, and to form the outer circumferential region, providing a re-entrant portion from which is now the inner circumferential wall, the end wall and the outer wall of the channel. Finally, apertures (slits) are made in the channel walls and the sealing members to allow lateral access of a cable or other conduit.

With this configuration, there is obtained the advantage that when the interior of the cavity is at a pressure greater than that outside it the pressure differential assists the sealing between the sealing means and the conduits positioned therein. Similarly, the sealing of the outer circumferential wall to the split tube and other portions of the assembly surrounding it is assisted. This is especially the case when, as is preferred, there is an annular circumferential region of reduced wall thickness in the circumferential wall, as indicated above, since this region is more readily expanded by the pressure differential to contact the portion surrounding it more firmly.

The longitudinally split tube may be of wraparound construction, i.e., comprising a sheet of relatively flexible material adapted to be placed around the junction and to be supported by the support means, or may comprise a pair of half-shells adapted to fit together and surround the junction, or in some cases may comprise both a wraparound sheet and a pair of half-shells. A bracing sleeve may be placed around the longitudinally split tube for greater mechanical strength.

The invention accordingly makes it possible to provide the user with means for protecting a junction between a plurality of conduits, providing a protection configuration that allows individual sealing of conduits where they pass through the wall of the protecting means, the sealing being capable if necessary of withstanding pressurization of the interior of the junction and the configuration being such that the junction area may be opened up for introduction or removal of a conduit, or for repair, without having to disturb existing seals at other conduit entry points.

The term "conduit" as used in this specification includes any elongate member for example a pipe, along which material can pass, and includes an electric cable having one or more electrically insulated electrical conductors bundled together, hereinafter referred to as a core, with or without a further protective casing, and and electric cable having more than one core with or without a further protective casing. The invention will hereinafter be more particularly described with reference to electric cables having one or more cores but it will be understood that the invention is not limited thereto.

The longitudinally split tube of the invention is relatively rigid to protect the junction thereunder against mechanical damage. It may be of metal or plastics material. It may be a sheet which is rolled into a tubular shape, the edges of which can be pulled apart sufficiently to allow it to be installed about and removed from the junction. Preferably, however, it comprises two half-shells which can be engaged, for example, by clipping together to form a tubular casing for a junction between conduits. The split tube may be in two or more parts one of which, for example, cooperates with a support means to provide outlets.

Alternatively the or each end region of the split tube may be positioned so that it rests on and covers the entire length of the support means. In tnis way the split tube cooperates with the channels to form outlets in the support means for the cable core. However, it is preferred that the or each end of the split tube rests on a portion of the length of the support means and a protective sleeve positioned thereabouts cooperates with the channels to form the outlets in the support means.

The split tube may be provided at each end with the support means of the invention.

The support means is contoured so as to provide one or more channels each capable of accommodating a core of the cable to be spliced. It may have more channels than the cable has cores, the empty channel(s) being plugged until needed to accommodate an additional core at a later date. The channels are shaped to accommodate the cores of the cables to be spliced and may for example be U-shaped or C-shaped, but may be of any configuration that allows a cable core to be laid thereon from the side, rather than being fed through a channel permanently closed in cross-section.

Preferably the support means is non-deformable under heat and/or pressure especially where it is to provide resistance against pull-out of the cable cores. Suitable materials include plastics, especially polyamides, for example nylon 6,6, fluorinated polyolefins, for example polytetrafluoroethylene, polyolefins including polyethylene and polypropylene, styrene-butadiene block copolymers and the so-called engineering thermoplastics especially polytetramethylene terephthalate. Also suitable, where a high pull-out resistance is not essential, are rubbers, including silicone, nitrile and ethylene/propylene rubbers. The materials may be crosslinked where appropriate with $\beta$ or $\gamma$ rays or by chemical means or by a combination thereof.

Each outlet formed by cooperation of a channel of the support means and the split tube or protective sleeve is adapted to be sealed to the cable core therein independently of the other cable cores. The channels may, for example, be provided with an upstanding sealing flange which extends transversely of the outlet and provides a barrier against the ingress of moisture between the wall of the channel and the cable core. The flange may be resilient and may be deformed by the cable core so as to provide a good seal. In a preferred embodiment, the outlet is provided with a sealing means comprising a sealant mass in the form of a layer of adhesive or mastic which may be in the form of tape wrappings. The sealant mass may be provided initially in the channel or on the portion of the cable core to be sealed thereto. Preferably the sealant mass is softenable by heat and in one embodiment flows when warmed to seal the cable firmly within its outlet. In the preferred method of installing this assembly about the junction, the cable cores are positioned in the appropriate channels, the split tube is positioned on the support means and a heat shrinkable sleeve positioned thereover. Heat is applied to the sleeve to shrink it about the split tube with the support means and a length of the cable protruding therefrom. The heat applied to the sleeve causes the sealant mass in the outlets to soften and the pressure of recovery of the sleeve about the support means forces the sealant mass around each core sealing it to its outlet.

The outlet may be provided with sealant damming means to retain the sealant within the outlet as far as possible. This may comprise a series of transverse step-like barriers, preferably integral with the support means, which serve to prevent exudation of the sealant mass from between the cable core and the outlet when the assembly is installed. The steps may increase in height towards the side of the support means which in use is furthermost from the junction. This prevents the sealant being exuded out from the outlet especially when the assembly is pressurised.

In a further embodiment the channels may be provided with a central wall for the sealant mass. One or both ends of the channels may be provided with a sealant damming means comprising one or more barriers which prevent exudation of the sealant mass from the outlet. The barriers are advantageously step-like in configuration, their height increasing toward the adjacent ends of the outlet.

In another embodiment the outlets are provided with at least one, preferably two, sealant damming means, each of which tends to prevent exudation of the sealant mass from the outlet. Advantageously the sealant damming means is in the form of a strap which is fastened about the cable core. The strap may be resilient so that it is maintained about the cable core in the outlet under a light compressive pressure by the presence of the split tube and/or the outer protective sleeve covering. It may also be provided with one or more flanges which provide additional resilience and add to the damming efficiency of the strap.

For example, each cable core may be provided with layers of adhesive tape at the portion thereof which is to be located in the outlet. The cable core may be further provided with two sealant damming means at each side of the layers of adhesive tape, advantageously partially overlapping them. Thus when the cable core is inserted into the channel, the adhesive can be warmed to soften it and is wedged between the two sealant damming means to fill up the gap between the cable core and the internal surface of the channel.

The split tube may be positioned about the junction so that each end rests on a support means of the invention, preferably resting in the regions of the channels so that it touches a sealant damming means to minimize bonding between the split tube and the support means.

Preferably the support means each comprise a block having a plurality of channels, and in such cases it has been found advantageous to provide them with a connexion bar therebetween to hold them together during installation. Preferably the connexion bar is of an electrically conducting material having an insulating material applied, e.g., coated thereon, so as to prevent a short circuit between the cable cores. In one embodiment the connexion bar serves not only to hold the spacers in position but also as a connexion point for any earth wires, leads or shields of the cable cores. It may be provided with one or more terminals which provide electrically conductive connexion points for any earth leads but may also or alternatively be used to retain the connexion bar in the support means. For example, the connexion bar may be provided with a plurality of upstanding and resilient terminals at each end, and the bar may be cut to length as required to space apart the support means by the correct length with reference to the splice and the split tube. The end terminal may then be used to bias resiliently the bar within an aperture therefor in the support means. The terminations may be shaped to accommodate spade connectors attached to the earth leads of the cable if desired.

Where only one end of the split tube is to be provided with a support means of the invention, the other end may be provided with a support means according to British Pat. No. 1,431,167 especially when it is to accommodate a single cable, or means comprising a built-up layer of adhesive or a plug of sealant etc.

In one preferred embodiment the end of the support means which, in use, is further from the junction is provided with deflectable tines to support the protective sleeve positioned thereover. The tines project longitudinally from the end of the support means and are preferably resilient or flexible to provide, on deflection, a smooth gradation of diameter from the support means onto the cable core(s) projecting therefrom. The tines may be integral with or attached to the support means. Preferably the tines are positioned at points which do not hinder entry of the cable core(s) into the outlets. Where the protective sleeve is heat recoverable, shrinkage thereof in the region of the tines causes collapse of the latter onto the cable cores providing a neat appearance at the ends of the assembly and lessening the likelihood of splitting of the protective sleeve on recovery thereof in this region.

Several forms of assembly constructed in accordance with the present invention will now be described, by way of example only, with reference to the accompanying drawings in which.

Figure 1:
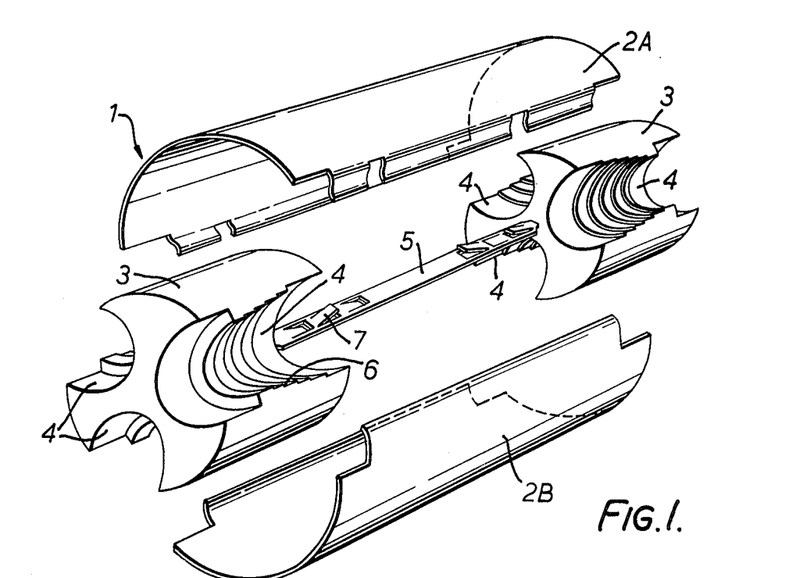
FIG. 1 is a perspective view of a first embodiment of the longitudinally split tube and the support means of the invention.

With reference now to FIG. 1 there is shown a first embodiment of part of the assembly, indicated generally by reference numeral 1, comprising a longitudinally split tube which is in the form of two half-shells 2A and 2B, each of which is so configured at its longitudinal edges to cooperate with the other. There are two support means each comprising a block 3 each of which has three channels 4. The blocks 3 are connected together but spaced from one another by connection bar 5.

Each block 3 is of solid circular cross-section in which are formed, at 120° intervals, the three channels 4 each of generally C-shaped configuration. Each channel 4 is provided in the central portion of the block with a number of integral barriers 6 which project into, and decrease the open cross-section of, the channels. The heights of the barriers are graduated so they form a series of steps, and the blocks 3 are positioned on the connection bar 5 so that the barriers 6 decrease in height towards the connection bar 5.

The connection bar 5 is provided with a plurality of upstanding resilient terminals 7 at each end region. The connection bar 5 can be cut to the required length to locate the blocks 3 at the required distance from each end of the junction. Each end of connection bar 5 can then be inserted into a block 3 deflecting a terminal 7 so that its outward resilience against the aperture (not shown) in the block 3 holds the connection bar 5 in place. The spare terminal 7 can serve a connection point for the earth shields of the cable cores of the splice.

Figure 2:
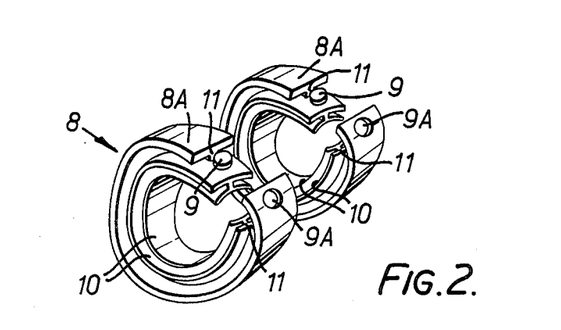
FIG. 2 is a perspective view of two sealant damming means for cooperation with the support means of FIG. 1.

In FIG. 2 there are shown two sealant dam means indicated generally by reference numeral 8 each comprising a strap 8A provided with a button and buttonhole closure 9 and 9A respectively. Each strap 8A is provided internally with a plurality of resilient flanges 10 which lie parallel to and, through spine 11, are integral with the strap 8A. The flanges 10 serve resiliently to bias the strap 8A away from the cable core on which it is positioned and thus hold the cable core in its channel 4 shown in FIG. 1.

Figure 3:
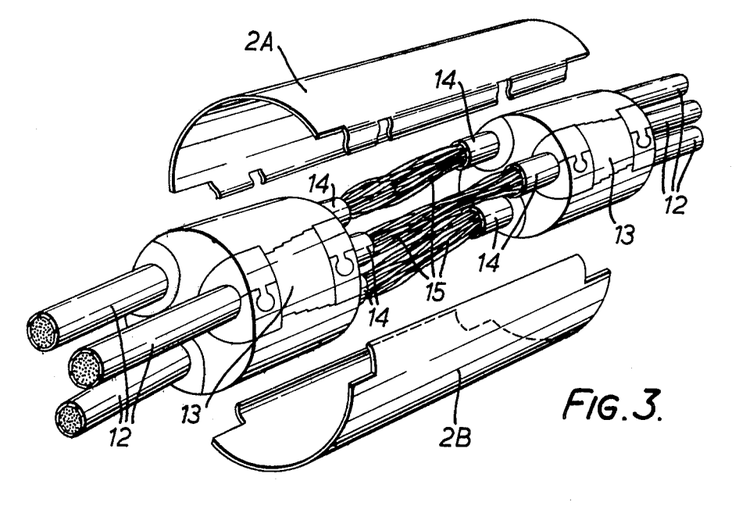
FIG. 3 is a perspective view of the support means of the assembly of FIG. 1 and the sealant damming means of FIG. 2 installed at the junction between two three core cables.

The sealant damming means 8 are shown buttoned-up about a cable core in FIG. 3 from which it can also be seen that two sealant damming means 8 are installed on each cable core 12. Although it cannot be seen from FIG. 3, each cable core 12 is wrapped with adhesive tape before the sealant damming means 8 are attached thereto.

The diameter of the cable core between the sealant damming means 8 is built up with layers of adhesive tape forming a sealing cohesive mass 13. Each cable core 12 is then laid into its channel 4 so that the two associated sealant damming means 8 fit therein on either side of the step-like barriers 6.

From FIG. 3 it can be seen that the three cores 12 of a telephone cable are connected by splicing (not shown) to the three cores 12 of a second telephone cable 13. The cable cores 12 have been stripped of insulation 14 for the splicing and the entire stripped area, the junction 15 of the cores 12, lies between the blocks 3. The cable cores 12 lying in the channels have not been stripped.

Figure 4:
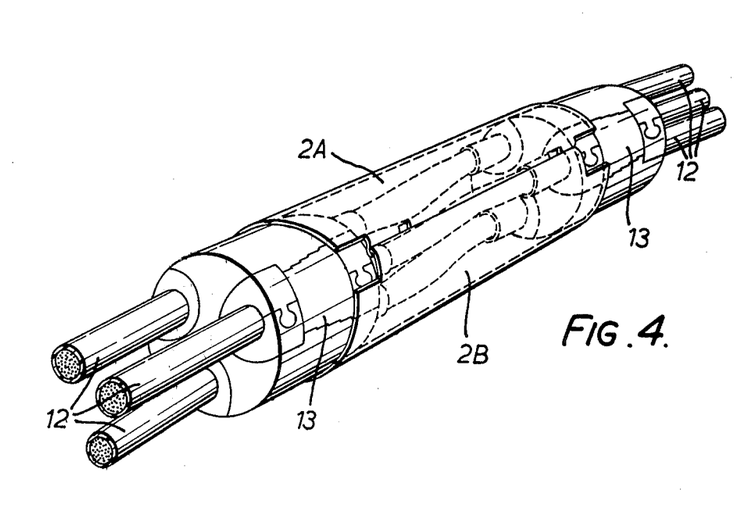
FIG. 4 is a perspective view of the assembly of FIG. 1 and the sealant damming means of FIG. 2 installed about the junction.
Figure 5:
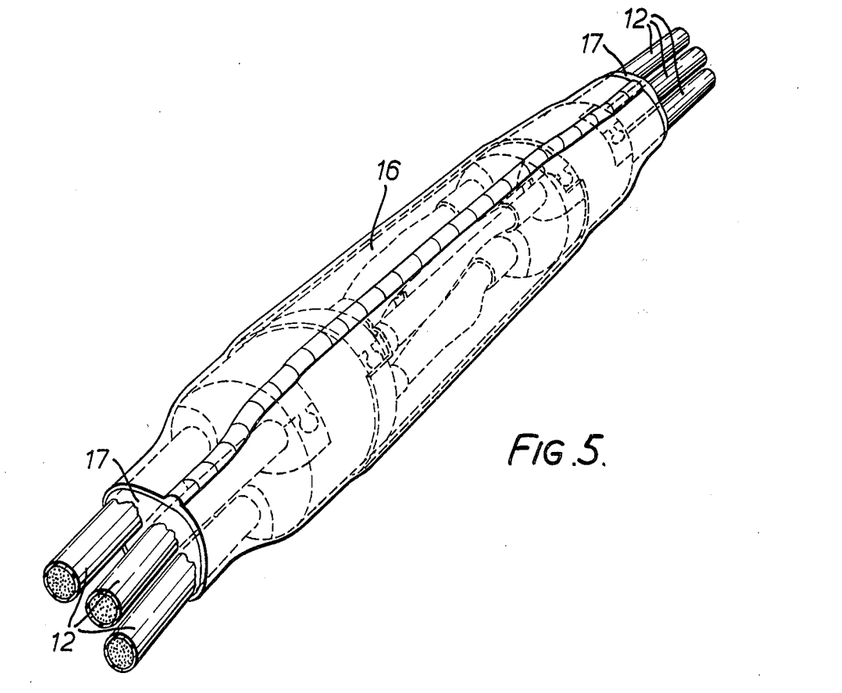
FIG. 5 is a perspective view of the assembly of FIG. 1, the sealant damming means of FIG. 2 and a protective heat shrinkable wraparound sleeve according to British Pat. No. 1,155,470 installed about the junction.

In FIG. 4 there are shown the half-shells 2A and 2B interlocked over the junction 15 and supported by a portion of each of the blocks 3. In FIG. 5 a protective heat shrinkable wraparound closure sleeve 16 has been installed about the assembly 1 so that it has been recovered about the entire length of the underlying blocks 3 and half shells 2A and 2B and also onto a portion of the length of the cable cores 12 protruding from the assembly 1. The sleeve 16 is provided internally with a layer of sealant which flowed under the heat applied to recover the sleeve 16 and provides an additional seal on to the cable cores as shown at 17. It can be seen that each channel 4 cooperates with the protective sleeve 16 to form a tubular outlet for each cable core 12 lying therein.

Figure 6:
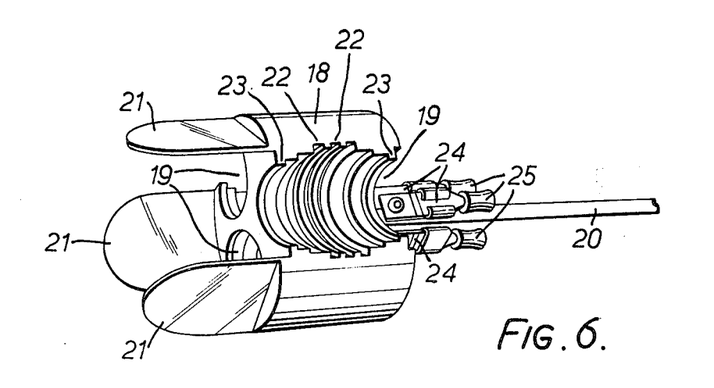
FIG. 6 is a perspective view of a second embodiment of the support means of the invention.

In FIG. 6 there is shown a support means comprising a block 18 having three channels 19 at 120° intervals and a connection bar 20. The block 18 is generally shaped like that of FIG. 1 except that it is provided at the side remote from the connection bar with three deflectable tines 21 each positioned adjacent to two channels 19 at the surface of the block so that it does not interfere with the entry of a cable core into an outlet. The deflectable tines 21 serve to provide additional support for a protective cover to be installed thereover and provide a smooth gradation from the block to the cable cores protruding therefrom by being deflectable towards the cable cores under the pressure of the protective sleeve.

The configuration of the channels 19 is also different from that in FIG. 1. Each channel 19 is provided at a central transverse portion with indentations 22 which serve as a well for a sealant mass. The end regions of the outlet are provided with upstanding transverse step-like barriers 23 which increase in height towards the edges of the block 18 and serve to prevent exudation of a sealant mass.

The connexion bar 20 adjacent to the block 18 is provided with a plurality of connexion terminals 24 over each of which has been slid a spade connector 25 for connexion to the earth leads of the cable cores.

Figures 7, 7A:
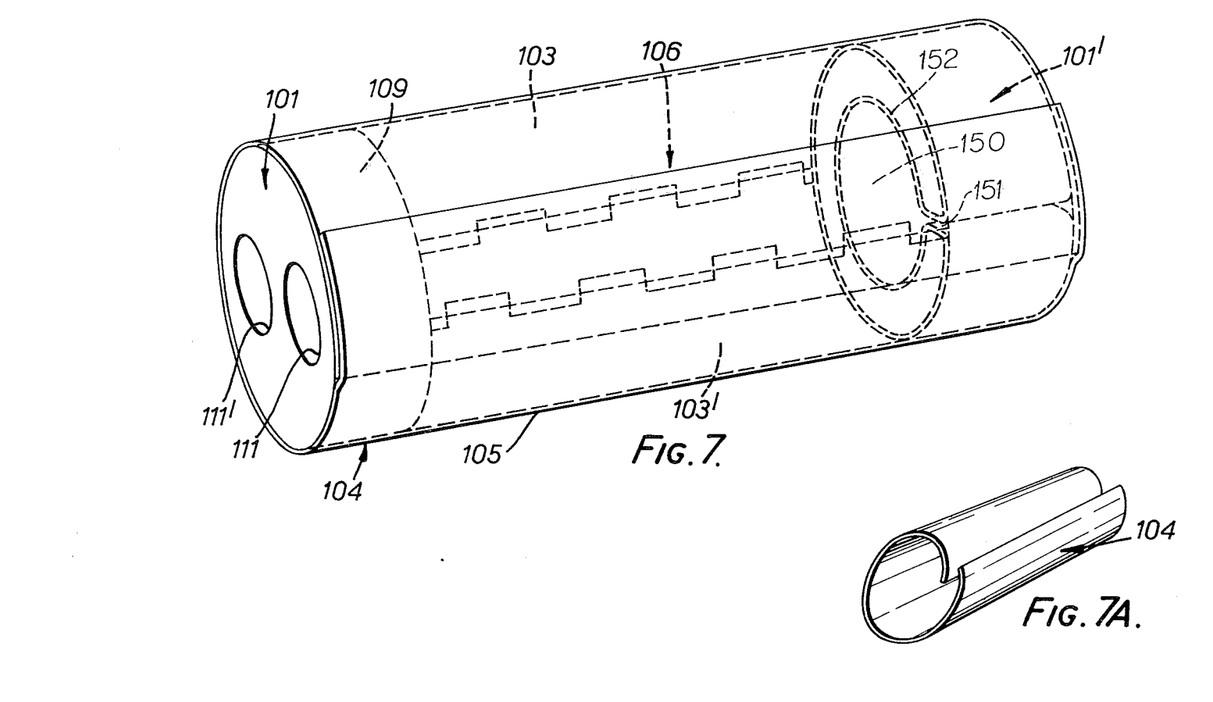
FIG. 7 is an overall prospective view of an assembly, with some interior portions shown in broken lines, this assembly embodying sealing means constructed so that an increase of pressure within the assembly assists in preventing peel failure of the bonding between it and the conduit.
FIG. 7a shows one form of split tube for use in the assembly of FIG. 7.
Figure 8:
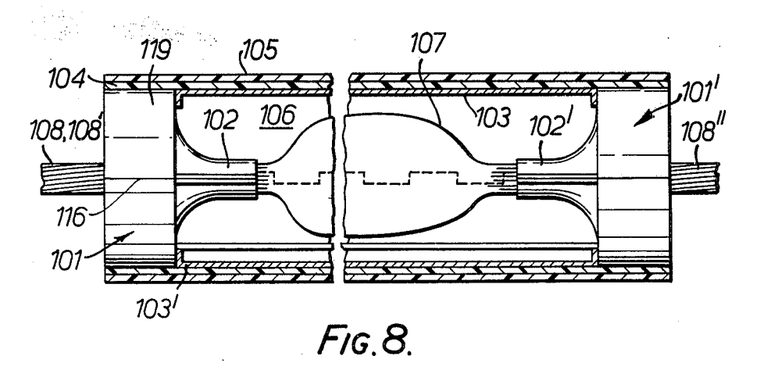
FIG. 8 shows through a completed assembly, partially in axial section.

Referring now especially to FIGS. 7 and 8 there is shown an assembly comprising two support means indicated generally by the reference numerals 101, 101', heat-shrunk sealing means, indicated generally by reference numerals 102, 102', a pair of half-shells 103, 103', an elastomeric split tube 104, heat shrunk over the exterior of the means 101, 101' and the shells 103, 103' and a rigid outer sleeve 105, formed, for example, of a polypropylene copolymer reinforced by glass fibre. Within the cavity 106 of the assembly is positioned a splice 107, between cables 108, 108', 108" etc.

The support means 101' is a contacting support means in that it contacts and supports the split tube formed by the half shells 103', 103' over substantially the whole circumference of at least one cross-section thereof, and the support means 101' is deformable to provide lateral access to the cable receiving channel 150 (a single channel in this example) via lateral aperture 151.

The support means 101' also comprises sealing means 152 for sealing a conduit positioned in the channel 150, the sealing means being doubled back on itself as shown so that an increase in pressure within the assembly does not increase the tendency of a bond between the sealing means and the conduit to fail by peeling. In practice, the illustrated design normally causes any such increase in pressure to decrease the peeling tendency. This principle is applicable to support means comprising sealing channels for more than one conduit, as illustrated in FIG. 9, discussed below.

Figure 9:
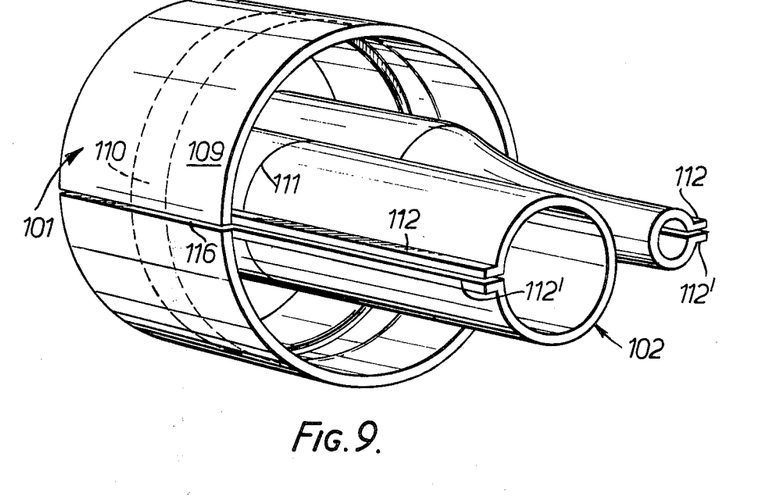
FIG. 9 shows a support means, with integral sealing means.
Figure 10:
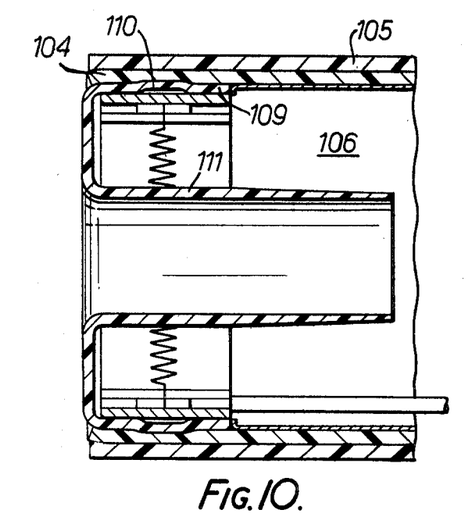
FIG. 10 shows in section one end of the assembly.

The support means 101 comprises an outer circumferential wall 109, having an annular portion 110 of reduced wall thickness (see FIGS. 9 and 10). Channels 111, 111' are formed in the means to accommodate the cables 108, 108' etc, and the walls of the channels are integral with the shrinkable sealing means 102. As can best be seen in FIG. 9, each sealing means 102 is provided with elongate rails 112, 112' on its outer surface. These rails may be maintained in abutment during shrinkage by mechanical means (not shown) as described above.

Figure 11:
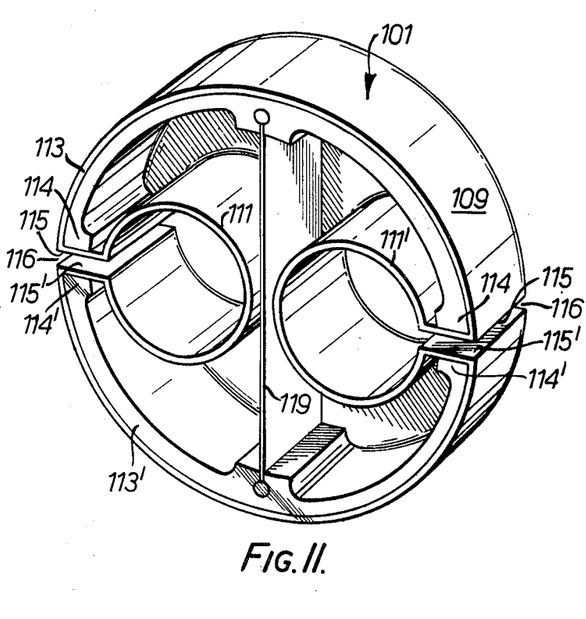
FIG. 11 is a perspective view of a support means, without integral sealing means, showing supporting devices.
Figure 12:
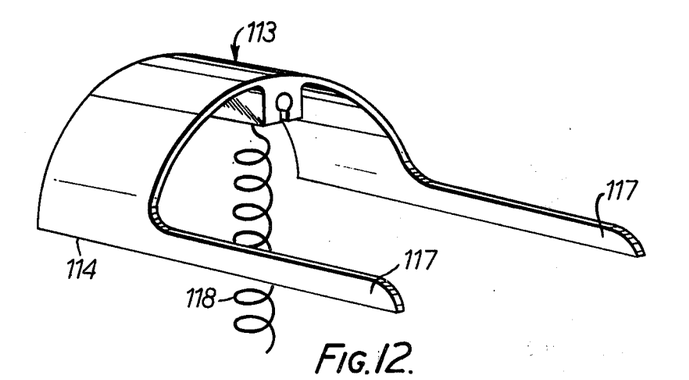
FIG. 12 is a view of a supporting device.

As can best be seen in FIGS. 11 and 12, supporting devices, indicated generally by reference numerals 113, 113' are provided within the circumferential wall 109, the ends 114, 114' of each support means acting in pairs on the surfaces 115, 115' of the walls 109, which surfaces together form the boundaries of the apertures 116, 116' in the wall.

As shown in FIG. 12, prongs 117 extend axially from the ends 114 of the supporting device 113 which prongs may overlie the rails 112 of the shrinkable sealing means 102.

A spring 118 (as shown in FIG. 12) or a heat shrinkable strip 119 (as shown in FIG. 11) joins the two supporting devices and causes their ends 114, 114' to press firmly against the surfaces 115, 115' to assist in sealing.

Figure 14:
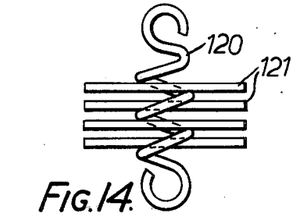
FIGS. 14 to 16 show forms of heat-activatable urging means.

FIG. 14 shows an alternative form of urging means, comprising a spring 120 held extended by a thermoplastic rod assembly 121.

Figures 13, 16A:
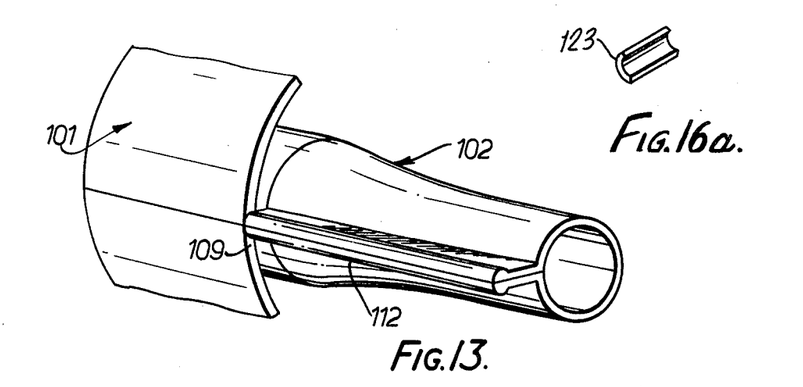
FIG. 13 shows part of a support means for use when a single conduit is to be joined.
Figure 15:
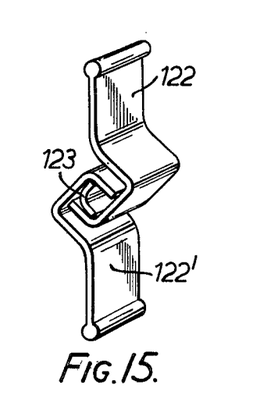
Figure 16:
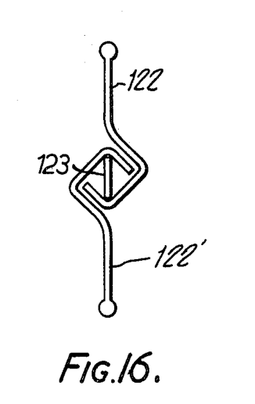
Figure 16B:
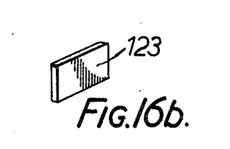

In FIGS. 15 and 16 a pair of strips 122, 122' is shown; their overlapping ends are urged apart (to cause their remote ends to approach) by a spring 123 which can be extended from its position shown in FIG. 16a to that shown in FIG. 16b, to cause the urging means to be activated.

Figure 17:
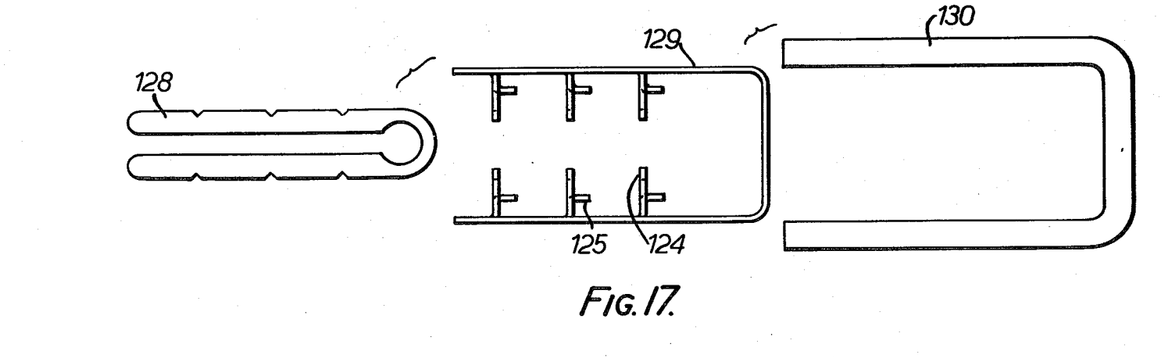
FIGS. 17, 18a and 18b show mechanical means for sealing the closure area of the support means of FIG. 13.
Figure 18:
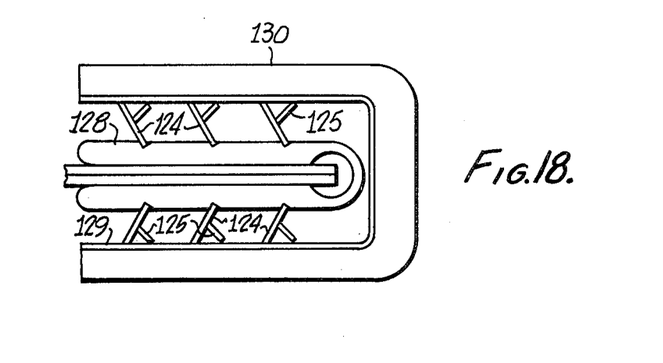
Figure 18A:
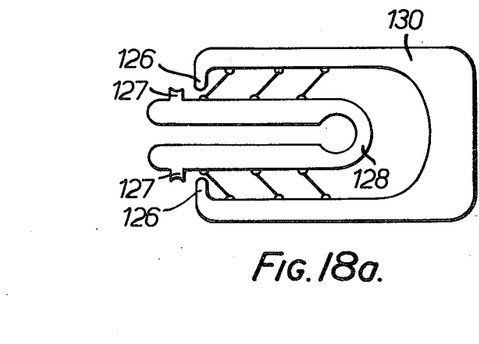
Figure 18B:
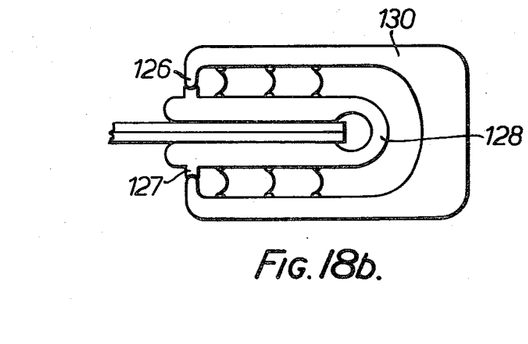

In FIG. 13 there is shown part of a support means for use when a single conduit is to be joined. The closure area of the support means is provided with rails 112 which may be provided with closure means as illustrated in FIGS. 17 and 18. The closure means of FIG. 17 are substantially U-shaped and provided with resilient teeth 124 which are deformed by insertion of the rails 112 between arms of the U-shaped closure. The resilient teeth are formed with stop members 125 which abut against the arms of the U-shaped closure thereby causing the resilient teeth to flex and increase the pressure on the rails. In FIG. 17 the closure means is formed from three parts, an inner U-shaped plastic member 128 which bears against the rails 112, a U-shaped spring member 129 which carries the resilient teeth 124, and an outer U-shaped bracing member 130. An alternative embodiment is shown in FIGS. 18a and b, in which the resilient teeth are arranged at an angle to the direction of insertion of the rails and are bent into a flexed semicircular configuration in operation. The springs may be fitted into slots in the U-shaped plastic member 128 and the U-shaped bracing member 130. The U-shaped bracing member 130 is provided with lugs 126 which cooperate with locking flanges 127 on the U-shaped plastic member 128.

In order to remove and replace a cable in the assembly it is only necessary to remove the mechanical closure means if present and cut off the heat shrunk sealing means. A new conduct can then be inserted into the channel and a further sealing means used to reseal the conduit into the channel. A preferred type of sealing means is described in British Patent Specification No. 45725/76 filed Nov. 3, 1976, German Offenlegungsschrift No. 27 48 894, the disclosure of which latter is incorporated herein by reference.

I claim:

1. An assembly for protecting a junction between conduits, the assembly being openable to allow access to repair the junction and comprising (a) a tubular sleeve comprising a longitudinal split tube of internal diameter such that it can accommodate the junction, (b) support means for the split tube for positioning on each side of the junction, at least one support means being contoured to provide a plurality of laterally-enterable channels, each of at least some of the channels being capable in cooperation with the tubular sleeve of forming an outlet closed in cross-section for accommodating a conduit, (c) sealing means for independently sealing a conduit to a channel so that each conduit can be sealed into the assembly independently of any other conduit present therein, and (d) mechanical means for maintaining the outlet closed in cross-section.

2. An assembly for protecting a junction between conduits, the assembly being openable to allow access to repair the junction and comprising a tubular sleeve comprising a longitudinal split tube of internal diameter such that it can accommodate the junction support means for the split tube for positioning on each side of the junction, at least one support means being contoured to provide a plurality of laterally-enterable channels, each of at least some of the channels being capable of forming an outlet closed in cross-section for accommodating a conduit, sealing means for independently sealing the conduit to a channel so that each conduit can be sealed into its outlet and thus into the assembly independently of any other conduit present therein, and mechanical means for maintaining the outlet closed in cross-section.

3. An assembly as claimed in claim 1 or 2, wherein each support means is positioned at an end of the split tube.

4. An assembly as claimed in claim 1 or 2, which also comprises a protective, electrically insulating heat-shrinkable wraparound sleeve.

5. An assembly as claimed in claim 1 or 2, wherein the split tube is a heat-shrinkable wraparound sleeve.

6. An assembly as claimed in claim 1 or 2, wherein the wall of each outlet is provided with a sealant damming means, whereby a conduit may be sealed in the outlet.

7. An assembly as claimed in claim 2, wherein at least one contoured support means is a contacting support means having an outer circumferential surface extending to provide contacting support for the split tube over substantially the whole of the circumference thereof at at least one cross-section thereof, at least the outer circumferential portion of the contacting support means being deformable to provide lateral access to at least one channel through an aperture in the circumferential portion.

8. An assembly as claimed in claim 7, wherein the contacting support means comprises said means for sealing a conduit positioned in a channel, the sealing means being doubled back on itself such that an increase in pressure within the assembly does not increase the tendency of a bond between the sealing means and the conduit to fail by peeling.

9. An assembly as claimed in claim 8, wherein the sealing means in such that an increase in pressure decreases said tendency.

10. An assembly as claimed in claim 1 or 2, wherein the support means comprises means for sealing a conduit positioned in the channel, the sealing means being doubled back on itself such that an increase in pressure within the assembly does not increase the tendency of a bond between the sealing means and the conduit to fail by peeling.

11. An assembly as claimed in claim 10, wherein the sealing means is such that an increase in pressure decreases said tendency.

12. An assembly as claimed in claim 1 or 2, wherein the means for sealing the conduit extends into the cavity defined by both the support means and the tubular sleeve.

13. An assembly as claimed in claim 12, wherein the means for sealing the conduit is integral with a contoured support means and is an extension of the wall of the channel to which it corresponds.

14. An assembly as claimed in claim 10, wherein the means for sealing the conduit is a heat-shrinkable sleeve.

15. An assembly as claimed in claim 7, wherein the contacting support means is provided, radially within the outer circumferential surface, with a support structure comprising at least one supporting device extending about the outer surface of the portion of the contacting support means whose inner surface defines a channel.

16. An assembly as claimed in claim 15, wherein the support structure extends the whole circumference of the contacting support means that define the outlet.

17. An assembly as claimed in claim 15, wherein the support structure is provided with resilient means capable of urging the aperture walls together.

18. An assembly comprising a longitudinal split tube, a pair of support means for supporting the tube at each end thereof, the pair of support means in combination with the split tube defining a cavity, at least one support means being contoured to provide a plurality of channels and having an outer circumferential surface to provide contacting support for the split tube at at least one cross-section of the split tube over the whole of the circumference of the split tube, at least the outer circumferential portion of the support means being deformable to provide lateral access to the channels, the walls of the channels of the support means extending within the cavity defined by the pair of support means and the split tube, whereby, on increase of pressure within the cavity a bond between the walls of such a channel and a conduit in the channel is increased, the assembly being openable to allow access to the conduit in the channel.

19. An assembly as claimed in claim 18, wherein the extending portions of the walls are integral with the support means, and are heat-shrinkable, and lateral access provided to the channels comprises a closable aperture in the circumferential wall of the support means and in the extending portion of the wall, the opposed surfaces of the extending portion of the wall bounding the aperture being provided with mechanical means, whereby bonding may be assisted after installation of a conduit.

20. A method of protecting and insulating a junction between conduits which comprises (1) selecting an assembly comprising (a) a tubular sleeve comprising a longitudinally split tube and (b) support means for each end of the split tube, at least one support means being contoured to provide a plurality of laterally-enterable channels, each channel being capable of cooperation with the tubular sleeve to form an outlet closed in cross-section, (2) positioning a conduit in such a channel, (3) positioning the tubular sleeve over the junction relative to the support means so as to form the outlets, (4) sealing the conduit into one of the outlets so that it is sealed into the assembly independently of any other conduit present and (5) applying mechanical means to the assembly to maintain each outlet closed in cross-section, the assembly being openable to allow access to the conduit.

21. An assembly for protecting a junction between conduits, the assembly being openable to allow access to repair the junction and comprising a tubular member and support means therefor, the support means having at least one longitudinally-extending laterally-enterable channel capable of forming an outlet closed in cross-section, means for providing sealing engagement with a cable inserted into said channel, and mechanical means for maintaining the outlet closed in cross-section.

22. An assembly as claimed in claim 21, wherein the channel is in part defined by a member having an inner surface defining the channel and an outer surface within the tubular member, whereby an increase in pressure on the outside surface assists the sealing of the inside surface to a cable positioned within the channel.

23. The assembly of claim 21 in which the tubular member peripherally engages the support means for sealing a cable in said channel.

24. A junction comprising the assembly of claim 1, and at least two conduits, the conduits being connected to each other, at least one conduit being independently sealed in an outlet.

* * * * *